March 3, 1936.     W. L. REMICK     2,033,008
APPARATUS FOR SEPARATING MIXED MATERIALS
Filed Dec. 21, 1931     2 Sheets-Sheet 2
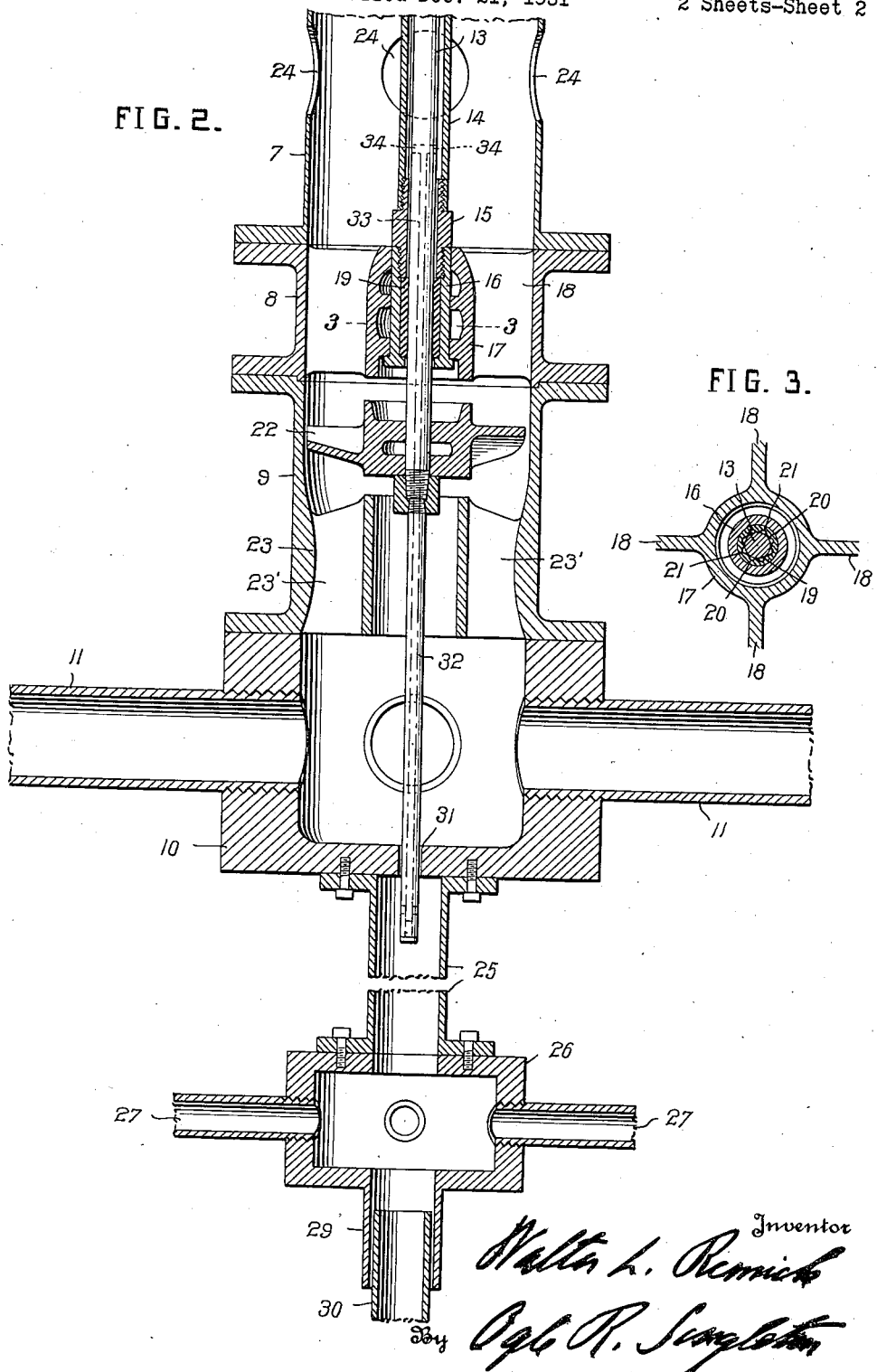
Inventor
Walter L. Remick
By Ogle R. Singleton
Attorney Patented Mar. 3, 1936

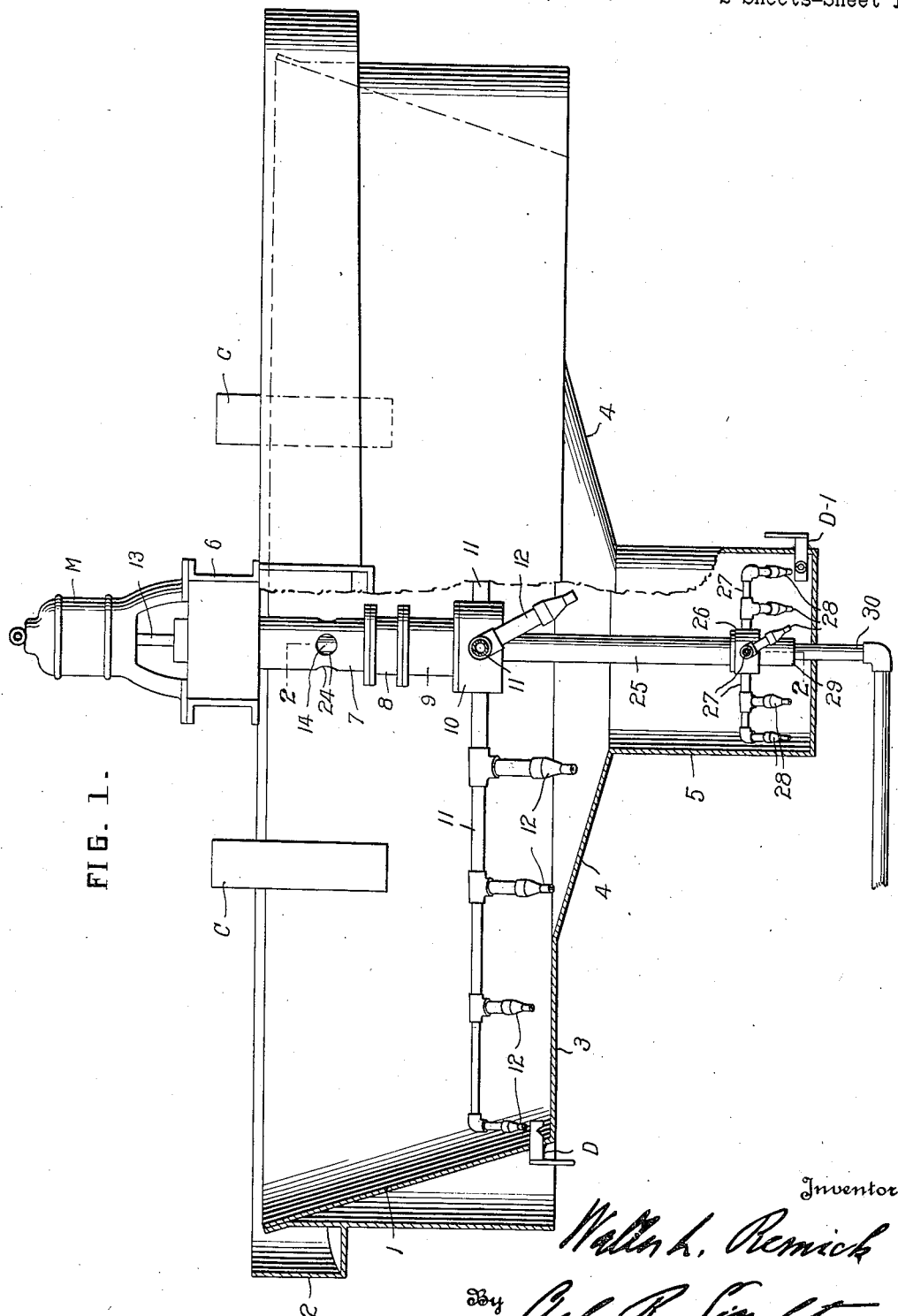

2,033,008

UNITED STATES PATENT OFFICE 2,033,008

APPARATUS FOR SEPARATING MIXED MATERIALS

Walter L. Remick, Hazleton, Pa., assignor to Hydrotator Company, Cleveland, Ohio, a corporation of Delaware Application December 21, 1931, Serial No. 582,464

7 Claims. (Cl. 209—160)

My invention consists in a new and useful improvement in apparatus for separating mixed materials, and is designed for separating materials of different specific gravities, and particularly for the treatment of ore to separate it from other materials with which it is mixed.

The improved apparatus which I have devised to practice my improved process constitutes an improvement upon the apparatus described in United States Letters Patent Number 1,767,227. In the operation of the apparatus disclosed in said patent, it was found that better settling in the tank is effected by dilution of the liquid mixture in the tank about 30% by the addition of clear water. To provide for this, I devised the improvement.

An auxiliary tank such as is described and claimed in United States Letters Patent Number 1,511,643 and designed to suit the size and gravity of the material and the amount of clear water used is attached to the bottom and center of the main tank. The main tank is of such size that the upward current of the amount of water overflowing will not raise and overflow any material which should sink. As disclosed herein, the main tank is of such size that no material larger than 200 mesh quartz will overflow with 1300 gallons per minute of flow. The small tank is of such size that 300 gallons per minute of clear water will keep in suspension hematite ore of sizes from 10 mesh down to the smallest sizes in the mixture.

The particularly novel and useful feature of my improved apparatus is the fact that the mechanism in the two tanks is so related that the rotatable nozzles in the two tanks are connected upon a common shaft, so that the water supplied to the auxiliary tank under pressure and operating the rotating nozzles in the auxiliary tank assists the rotation of the nozzles in the main tank.

The mixture of the ore, quartz and clay is fed into the main tank. The heavier material finds its way into the small tank, meeting the upward current of clear water which is regulated to prevent quartz particles settling to the discharge from the bottom of the auxiliary tank. These quartz particles with some fine ore accumulate in the bottom of the main tank and are drawn off, for retreatment, at the bottom of the main tank. The excess water, clay and quartz overflow from the launder of the main tank. Since the heavier material goes into the auxiliary tank, it does not accumulate in the bottom of the main tank, and, therefore, less power is required to rotate the agitator in the main tank than would be required if the larger particles of the material were held in suspension in the main tank.

While I have hereinafter fully described my improved process and one specific embodiment of my improved process as fully illustrated in the drawings filed herewith, it is to be distinctly understood that I do not consider my invention limited to this specific embodiment and its operation, but refer for the scope of my invention of both process and apparatus to the claims appended hereto.

In the drawings:
Fig. 1 is a side elevation, partly in section.
Fig. 2 is a section on the line 2—2 of Fig. 1.
Fig. 3 is a section on the line 3—3 of Fig. 2.

In my device as illustrated in the drawings, there is the main tank 1 having the overflow launder 2, and a bottom comprising the outer portion 3 which is horizontally disposed and the inner portion 4 which is downwardly inclined to the auxiliary tank 5. Suitably mounted over the tank 1, there is the supporting frame 6 from which depends the rotatable pipe 7 extending into the tank 1 and having coupled thereto at its lower end the short pipe 8 to which is attached the head pipe 9. To the pipe 9 there is attached the head 10 from which extend laterally, adjacent the bottom of the tank 1, the pipes 11 provided with downwardly projecting tangentially disposed nozzles 12. Suitably mounted upon the frame 6 there is the motor M having the downwardly extending shaft 13. Suitably suspended from the frame 6, there is the casing 14 for the shaft 13, which is attached by means of the coupling 15 to a jacket 16 mounted in the core 17 of a series of guide vanes 18 carried in the pipe 8, the jacket 16 is provided on its interior with a soft rubber bearing 19 having the flutes 20 and groves 21, the flutes 20 being so positioned as to contact the shaft 13 which passes therethrough and has upon its lower end, in the pipe 9, the impeller head 22. The pipe 9 has a constricted portion 23 with discharge vanes 23' to provide a discharge throat into the head 10. The pipe 7 is provided with a series of inlet openings 24.

Suspended from the head 10 there is the pipe 25 extending downwardly into the auxiliary tank 5, and to which there is attached the head 26 having a series of pipes 27 extending laterally therefrom adjacent the bottom of the tank 5, and provided with downwardly projecting tangentially disposed nozzles 28. The head 26 is also provided with the downwardly extending pipe 29 into which is loosely received the upwardly extending pipe 30 passing through the bottom of the tank 5.

Extending upwardly from the pipe 25 through the opening 31 in the head 10, there is the pipe 32 which is attached to the end of the shaft 13 and is in communication with the bore 33 in the shaft 13, which has its outlet holes 34 at points on the shaft 13 directly above the coupling 15.

At any point upon the perimeter of the portion 3 of the bottom of the tank 1, there is provided a controlled discharge D, and at the bottom of the tank 5 there is provided the controlled discharge D—1. I provide the feed chutes C, to introduce the materials into the tank 1, and they are so disposed relative to the portions 3 and 4 of the bottom of the tank 1, that the tendency is for the materials to be discharged upon the outer edge of the portion 4.

From the foregoing description of the details of construction of my improved apparatus, its operation and use in the practice of my improved process will be obvious. I supply the proper amount of water to the tank 1, by the pipe 30 through the tank 5. The ore particles mingled with the clay and particles of quartz are fed into the tank 1 through the chutes C, and pass through the water in tank 1 to the bottom 4. The motor M turning the impeller head 22 causes the water in tank 1 to circulate through the holes 24 in the pipe 7 and out through the pipes 11 and nozzles 12, causing rotation of the pipes 11. This action, affecting the mixture of the materials, causes separation of the particles of ore from the clay and quartz. The operation of this portion of my device is such as to cause an overflow in the launder 2 of the clay and quartz particles, and the settlement of the particles of ore upon the bottom 4. However, experiments have shown that in this operation there are certain of the particles of quartz which are too light to sink and too large to overflow, and also that there are certain particles of ore which are too heavy to overflow and too small to sink. Such particles of both ore and quartz will, therefore, if allowed to remain in suspension, accumulate on the bottom of the tank 1, or they will so build up the density of the fluid mass in the tank 1 that eventually they may flow out through the launder 2. In any case, they constitute a middling which should be withdrawn for treatment in a separate apparatus. However, by maintaining a supply of clear water through the pipe 30 and the tank 5, the heavy ore particles on the inclined bottom 4 of the tank 1 are cleaned and deposited in the tank 5, and, at the same time this upward flow of clear water from the tank 5 into the tank 1 prevents the quartz particles from settling into the tank 5. Thus this upward flow of water from the tank 5 assists the formation of the middling product which, by the centrifugal action of the nozzles 12, is moved outwardly over the level portion 3 of the bottom of the tank 1.

The accumulated particles of ore may be withdrawn from the bottom of the tank 5 through the discharge D—1, and the middling product composed of the mixture of cleaned ore and quartz may be withdrawn from the bottom of tank 1 through the discharge D.

It is to be noted that as the rotating pipes 27 are attached to the rotating pipes 11, through the heads 26 and 10 connected by the pipe 25, the force exerted by the water under pressure introduced through pipe 30 assists the operation of the separation apparatus in the tank 1.

It is obvious that a small quantity of the water under pressure introduced through pipe 30 into the head 26 will pass through pipes 25 and 31, and the bore 33 to escape through holes 34 into the casing 14 to pass downwardly through the coupling 15 and the grooves 21 to affect the shaft 13 and its bearing 19, being drawn therethrough by the action of the impeller head 22.

It will be seen that, by varying the absolute and the relative sizes of the main tank 1 and the auxiliary tank 5 I am able to adapt the device to varying conditions existing in the feed materials. For instance, the amount, size and gravity of the feed particles and the amount of liquid introduced into the feed chutes C determine the size of the main tank 1. The size of the auxiliary tank 5 is determined by the amount and size of the solid particles which are to be discharged from D—1 and the amount of water needed to keep these solids in suspension and prevent the settling in tank 5 of material which is intended to be discharged from D. The amount of water introduced through 30 overflows the main tank 1 and likewise affects the size of the main tank 1. Thus it is seen that the main tank and the auxiliary tank may vary in size between any limits and may, for instance, be of the same diameter. The same conditions determine the size of the pump and the horsepower of the motor.

It should be kept in mind that the settling velocities of particles of different size but the same specific gravity vary directly as the size, while the settling velocity of particles of the same size and different specific gravities vary directly as the specific gravity. Thus the sizes of the various materials has the same effect as the gravities. Thus the process may be used, where there is only a variation in size of materials, as a sizing device.

Having described my invention, what I claim is:

1. In an apparatus for separating mixed materials, the combination of means to produce hydraulic classification having a tank, a pipe in said tank, a bearing in said pipe and a shaft journaled in said bearing; and a second pipe entering said tank and communicating with said bearing.

2. In apparatus for separating mixed materials, the combination with means to produce hydraulic classification having a tank, a pipe in said tank, a bearing in said pipe and a shaft journaled in said bearing, of a second pipe to supply liquid to said tank; and a liquid supply means from said second pipe to said bearing.

3. In a liquid circulating apparatus, the combination of a liquid conduit; a bearing mounted in said conduit and having a fluted interior surface; a shaft journaled in said bearing; and a liquid impeller mounted on said shaft.

4. In a liquid circulating apparatus, the combination of a liquid conduit; a bearing mounted in said conduit and having a fluted interior surface; a shaft journaled in said bearing; a liquid impeller mounted on said shaft; and means adapted to supply liquid to said bearing to be drawn through the grooves between the flutes of the interior surface of the bearing by action of the impeller.

5. In a liquid circulating apparatus, the combination of a liquid conduit; a bearing mounted in said conduit and having a fluted interior surface; a shaft journaled in said bearing and having a bore communicating with the grooves between the flutes of the interior surface of the bearing; a liquid impeller mounted on said shaft; and a liquid supply pipe mounted on said shaft and communicating with the bore in the shaft.

6. In an apparatus for separating mixed materials, the combination of a tank provided in its bottom with a centrally disposed depending tubular portion; a tubular casing rotatably mounted in said tank and provided near its upper portion with a series of inlet openings; a series of horizontally disposed pipes mounted on the bottom of said casing and in communication therewith; nozzles on said pipes; a motor-driven impeller journaled in said tubular casing between the inlet openings and the said pipes; a series of horizontally disposed pipes suspended from said tubular casing, disposed in the lower part of said tubular portion of the tank and provided with nozzles; and a supply pipe passing through the bottom of said tubular portion and communicating with said second series of pipes.

7. In an apparatus for separating mixed materials, the combination of a tank provided in its bottom with an outer peripheral horizontally disposed floor, an inner peripheral concave floor, and a centrally disposed depending tubular portion; a tubular casing rotatably mounted in said tank and provided near its upper portion with a series of inlet openings; a series of horizontally disposed pipes mounted on the bottom of said casing and in communication therewith; nozzles on said pipes disposed closely adjacent the said floors of the tank; a motor-driven impeller journaled in said tubular casing between the inlet openings and the said pipes; a series of horizontally disposed pipes suspended from said tubular casing, disposed in the lower part of said tubular portion of the tank, and provided with nozzles; and a supply pipe passing through the bottom of said tubular portion and communicating with said second series of pipes.

WALTER L. REMICK.